United States Patent Office 2,838,366
Patented June 10, 1958

2,838,366

OXIDATIVE METHOD OF SEPARATING PLUTONIUM FROM NEPTUNIUM

Loren J. Beaufait, Jr., Richmond, Calif., assignor to the United States of America as represented by the United States Atomic Energy Commission No Drawing. Application March 25, 1948
Serial No. 17,118

10 Claims. (Cl. 23—14.5)

This invention relates to a method of separating neptunium from plutonium.

Plutonium exists in at least four valence states, +3, +4, +5, and +6. Neptunium in at least three of these valence states, +4, +5, and +6. The behavior of these two elements in the presence of various anions with or without a carrier cation depends upon the valence state of the elements and upon the solubility of the carrier formed. Thus fluorine ions form insoluble fluorides of the two elements in a valence state not greater than +4. Also when these elements are in the +6 state of oxidation they form insoluble complex acetates with alkali metals, and they are carried from solution as sodium neptunyl acetate and sodium plutonyl acetate, especially when sodium uranyl acetate is present as a carrier.

It is an object of this invention to provide an efficient means of preferentially oxidizing neptunium without oxidizing plutonium.

It is also an object of this invention to provide a composition comprising neptunium essentially free of plutonium.

It is a further object of this invention to provide a simple and effective means of separating neptunium from plutonium.

A further object is to provide an improved fast method of separating neptunium from plutonium.

In accordance with this invention neptunium is separated from a aqueous solution containing neptunium and plutonium in valence states not greater than +4 by contacting said solution with dichromate ions at below 50° C. and preferably between 15 to 30° C., thus oxidizing the neptunium to a valence state greater than +4 without oxidizing any substantial amount of plutonium, and thereafter adding ions which form an insoluble carrier precipitate which carries the plutonium from solution, leaving the neptunium behind in the supernatant solution. A preferred embodiment of this invention comprises contacting the solution oxidized as above with lanthanum ions and fluoride ions, thus precipitating lanthanum fluoride and plutonium fluoride and then separating the resultant precipitate and supernatant solution.

The operation of this invention is illustrated by the following examples.

EXAMPLE I

In this example an aqueous nitric acid solution containing plutonium and neptunium ions in valence states not greater than +4 was made 0.15 M in acetate ion, 0.19 M in acetic acid and 0.10 M in sodium dichromate. The solution was then held at about 22° C. for various lengths of time. After standing the samples of solution were made 0.8 M in nitric acid, and sufficient lanthanum ions in the form of lanthanum nitrate and fluoride ions in the form of hydrofluoric acid were added to form a precipitate of lanthanum fluoride. This precipitation removes any unoxidized plutonium and neptunium in the solutions. The following table gives typical results.

| Uranyl concentration | Time, Min. | Percent Pu Oxidized | Percent Np Oxidized |
|---|---|---|---|
| 0 | 5 | 2 | 98 |
| 0 | 30 | 6 | 95 |
| 0 | 150 | 23 | 98 |
| 0.005 M | 30 | 0 | 99 |

In the above solutions tracer 50-year $Pu^{238}$ and 2.3-day $Np^{239}$ were used. The quantities of these tracers in the original solution and in the lanthanum fluoride precipitates were determined by the usual radiochemical techniques. The data show that an acid solution of dichromate at room temperature will oxidize essentially all of the neptunium to the fluoride-soluble state while leaving most of the plutonium in a state of oxidation in which it is carried from solution by lanthanum fluorides provided the oxidation is not too prolonged. When the time of oxidation is as long as two and one-half hours, about 23% of the plutonium is oxidized under the conditions of this example.

EXAMPLE II

In this example oxidation was carried out in $HNO_3$—$Na_2Cr_2O_7$ solutions. The solutions employed were made up as follows:

| | Volume in Microliters | | | |
|---|---|---|---|---|
| | I | II | III | IV |
| $Np^{239}$ tracer solution | 40 | 40 | 40 | 80 |
| $Pu^{238}$ tracer solution | 50 | 50 | 50 | 50 |
| 10 N $HNO_3$ | 50 | 100 | 200 | 300 |
| Water | 310 | 260 | 160 | 20 |
| 1.0 M $Na_2Cr_2O_7$ | 50 | 50 | 50 | 50 |
| Total Volume | 500 | 500 | 500 | 500 |

The chief differences in composition of these solutions were in the quantity of nitric acid used.

At the close of various time intervals 100 microliter aliquots were withdrawn from the solutions and the extent of oxidation of the plutonium and neptunium was determined by the addition of lanthanum ions and fluorine ions in the presence of 0.005 M uranyl nitrate, thus forming a lanthanum fluoride precipitate which carried the unoxidized plutonium from solution along with small amounts of neptunium.

After removal of the precipitate, sulfur dioxide was passed through the solution to reduce the neptunium and any remaining plutonium to at least the +4 state of oxidation. Following this reduction fluorine ions and lanthanum ions were added in the order just stated, thus yielding a lanthanum fluoride precipitate. This precipitate carried the plutonium which had been previously oxidized by the dichromate along with the bulk of the neptunium. The plutonium in this precipitate was determined by alpha-counting using the usual radiochemical techniques. The neptunium in the first precipitate was determined by beta-counting using the usual radiochemical techniques. The results are given in Table I, which shows the percentages of plutonium and neptunium which had been oxidized by the dichromate treatment.

Table I
OXIDATION IN HNO₃—Na₂Cr₂O₇ SOLUTIONS AT 25° C.

| Solution | Aliquot | HNO₃ Conc. | Time of Oxidation | Percent Np Oxidized | Percent Pu Oxidized |
|---|---|---|---|---|---|
| I | 1 | 1 N | 3.5 hrs | 93 | 41 |
|   | 2 | 1 N | 6.5 hrs | 92.5 | 61 |
|   | 3 | 1 N | 24 hrs | 98.2 | 99 |
| II | 1 | 2 N | 3 min | 98.1 | 5 |
|    | 2 | 2 N | 3.25 hrs | 94 | 12 |
|    | 3 | 2 N | 19 hrs | 98.5 | 30 |
|    | 4 | 2 N | 46 hrs | 98 | 50 |
| III | 1 | 4 N | 3 min | 98.7 | 6 |
|     | 2 | 4 N | 1 hr | 98.7 | 6 |
|     | 3 | 4 N | 3 hrs | 98.7 | 7 |
|     | 4 | 4 N | 21.5 hrs | 98.8 | 9 |
|     | 5 | 4 N | 34.5 hrs | 98.6 | 13 |
| IVa | 1 | 6 N | 4 min | 98.3 | 6 |
|     | 2 | 6 N | 19 hrs | 98.3 | 7 |
|     | 3 | 6 N | 57.5 hrs | 98.7 | 10 |
| IVb | 1 | 6 N | 5 min | 98.4 | 6 |
|     | 2 | 6 N | 4 hrs | 98.2 | 7 |
|     | 3 | 6 N | 17.25 hrs | 98.5 | 11 |

The data of Table I show that when the nitric acid concentration was 1 to 2 N the plutonium was slowly oxidized so that it did not carry well with the first lanthanum fluoride precipitate. However, when the nitric acid concentration was 4 to 6 N the plutonium remained largely unoxidized and so carried well with the first lanthanum fluoride precipitate. In all cases only relatively small amounts of the neptunium remained unoxidized to carry down with the first lanthanum fluoride precipitate.

EXAMPLE III

In the third example oxidation of the neptunium was carried out in $H_2SO_4$—$Na_2Cr_2O_7$ solutions. The solutions were made up as follows:

|  | Volume in Microliters | | |
|---|---|---|---|
|  | I | II | III |
| Np²³⁹ tracer solution | 10 | 5 | 20 |
| Pu²³⁸ tracer solution | 50 | 50 | 50 |
| 10 N H₂SO₄ | 200 | 300 |  |
| 20 N H₂SO₄ |  |  | 200 |
| Water | 190 | 95 | 180 |
| 1 M Na₂Cr₂O₇ | 50 | 50 | 50 |
| Total Volume | 500 | 500 | 500 |

At the close of various time intervals 100 microliter aliquots were withdrawn from the solutions and the extent of oxidation of the plutonium and neptunium was determined as described in detail in Example II.

The detailed data are presented in Table II. They show that in 4 to 8 N sulfuric acid solution the plutonium largely remains unoxidized and therefore carries with the first lanthanum fluoride precipitate. In contrast, the neptunium that remains unoxidized is less than 2% in all cases.

Table II
OXIDATION IN H₂SO₄—Na₂Cr₂O₇ SOLUTIONS AT 25° C.

| Solution | Aliquot | H₂SO₄ Conc. | Time of Oxidation | Percent Np Oxidized | Percent Pu Oxidized |
|---|---|---|---|---|---|
| I | 1 | 4 N | 5 min | 98.8 | 7 |
|   | 2 | 4 N | 3.5 hrs | 98.75 | 9 |
|   | 3 | 4 N | 17 hrs | 99.05 | 11 |
| IIa | 1 | 6 N | 15 min | 99.25 | 5 |
|     | 2 | 6 N | 16.5 hrs | 99.20 | 5 |
|     | 3 | 6 N | 25.5 hrs | 98.8 | 5 |
|     | 4 | 6 N | ~69 hrs | 98.5 | 4 |
| IIb | 1 | 6 N | 5 min | 99.3 | 2 |
|     | 2 | 6 N | 3 hrs | 99.5 | 4 |
|     | 3 | 6 N | 8 hrs | 99.4 | 4 |
|     | 4 | 6 N | 23.5 hrs | 99 | 3 |
|     | 5 | 6 N | 71 hrs | 98.6 | 5 |
| III | 1 | 8 N | 2 min | 99.5 | 5 |
|     | 2 | 8 N | 1 hr | 98.7 | 6 |
|     | 3 | 8 N | 5 hrs | 99.5 | 6 |
|     | 4 | 8 N | 22.5 hrs | 99.65 | 5 |

In both examples, II and III, when the acidity is 4 to 8 N, the rate of oxidation of plutonium by dichromate is sufficiently slow that no appreciable losses of this element will occur in the lanthanum fluoride precipitation process even if plant operation shutdowns of twenty-four hours or longer should occur. Also the neptunium is sufficiently oxidized so that it does not carry down with the plutonium. Higher acidity than 8 N may be used, such as 16 N or higher, but preferably the acidity is kept below 7 N for nitric acid and below 10 N for sulfuric acid. The data presented show that a decontamination factor for neptunium of approximately 100 will be obtained in one $H_2SO_4$—$Cr_2O_7^{-2}$ oxidation cycle.

While there have been described certain embodiments of my invention, it is to be understood that it is capable of many modifications. Changes, therefore, may be made without departing from the spirit and scope of the invention as described in the appended claims.

What is claimed is:

1. A process for the preferential oxidation of neptunium in an aqueous solution containing neptunium and plutonium each in a valence state not greater than +4 and mineral acid in a concentration of at least 4 N, comprising digesting said solution in the presence of dichromate ions at a temperature of below 50° C.

2. The process of claim 1 wherein the source of the dichromate ions is an alkali dichromate.

3. The process of claim 1 wherein the source of the dichromate ions is sodium dichromate.

4. The process of claim 1 wherein the solution is between 4 to 7 N in nitric acid.

5. The process of claim 1 wherein the solution is between 4 to 10 N in sulfuric acid.

6. A process for the separation of neptunium from plutonium in an aqueous solution containing neptunium and plutonium each in an oxidation state not greater than +4 and mineral acid in a concentration of at least 4 N, comprising contacting the solution with dichromate ions, then digesting the solution at a temperature of 15 to 30° C., adding lanthanum ions and fluorine ions whereby a lanthanum fluoride-plutonium-containing precipitate is formed, and thereafter separating the supernatant solution containing the neptunium from the precipitate containing the plutonium.

7. The process of claim 6 in which lanthanum nitrate is the source of the lanthanum ions and hydrofluoric acid is the source of fluorine ions.

8. The process of claim 6 wherein the acid is nitric acid.

9. The process of claim 6 wherein the acid is sulfuric acid.

10. A process for the separation of neptunium from plutonium in an aqueous solution containing neptunium and plutonium each in a valence state not greater than +4, nitric acid in a concentration not greater than 1.0 M, acetic acid and sodium acetate, comprising treating the solution with dichromate ions, digesting the solution at 15 to 30° C. whereby the neptunium is selectively oxidized, then treating the solution with a lanthanum fluoride precipitate, thereafter separating the plutonuim-containing precipitate from the supernatant solution.

References Cited in the file of this patent

Seaborg et al.: Journal of the American Chemical Soc., vol. 70, pp. 1128–1134 (1948). Report submitted March 21, 1942.